US012698460B2

(12) United States Patent

Hollering

(10) Patent No.: US 12,698,460 B2
(45) Date of Patent: Aug. 4, 2026

(54) HOP EXTRACT

(71) Applicant: Heineken Supply Chain B.V., Zoeterwoude (NL)

(72) Inventor: Paulien Hollering, Zoeterwoude (NL)

(73) Assignee: HEINEKEN SUPPLY CHAIN B.V., Zoeterwoude (NL)

( * ) Notice: Subject to any disclaimer, the term of this patent is extended or adjusted under 35 U.S.C. 154(b) by 355 days.

(21) Appl. No.: 18/211,145

(22) Filed: Jun. 16, 2023

(65) Prior Publication Data

US 2023/0332077 A1     Oct. 19, 2023

Related U.S. Application Data

(63) Continuation of application No. PCT/EP2021/085741, filed on Dec. 14, 2021.

(30) Foreign Application Priority Data

Dec. 17, 2020    (EP) .................................... 20215228

(51) Int. Cl.
    *C12C 3/08*        (2006.01)
    *C12C 12/04*       (2006.01)
(52) U.S. Cl.
    CPC ............... *C12C 3/08* (2013.01); *C12C 12/04* (2013.01)
(58) Field of Classification Search
    CPC ................................... C12C 3/08; C12C 12/04
    See application file for complete search history.

(56) References Cited

U.S. PATENT DOCUMENTS

| | | |
|---|---|---|
| 5,384,135 A | 1/1995 | Caluwaerts |
| 2007/0254063 A1 | 11/2007 | Aerts et al. |

FOREIGN PATENT DOCUMENTS

| | | |
|---|---|---|
| CN | 101875899 A | 11/2010 |
| WO | WO-2005/058336 A1 | 6/2005 |
| WO | WO-2020/016412 A2 | 1/2020 |

OTHER PUBLICATIONS

Boulton et al (2013) "Dry Hopping' in: 'Encyclopedia of Brewing'", Aug. 5, 2013, p. 198.
Hrnčič et al (2019) "Hop compounds: Extraction techniques, chemical analyses, antioxidative, antimicrobial and anticarcinogenic effects", Nutrients, Jan. 24, 2019, 11(257) pp. 1-37.
International Search Report and Written Opinion issued in PCT Application No. PCT/EP2021/085741 dated Mar. 22, 2023 (12 pages).
Kowalczyk et al (2013) "The phenolic content and antioxidant activity of the aqueous and hydroalcoholic extracts of hops and their pellets : Phenolic content and antioxidant activity of extracts of hops", Journal of the Institute of Brewing, Jul. 1, 2013, pp. 103-110.
Loredana et al (2018) "Impact of osmotic distillation on the sensory properties and quality of low alcohol beer", Journal of Food Quality, vol. 2018, Article ID 8780725, Jan. 21, 2018, pp. 1-11.
Smith (2015) "Hop tea and sampling your beer brewing hops" Jul. 21, 2015, pp. 1-2 retrieved from URL:https://beersmith.com/blog/2015/07/21/hop-tea-and-sampling-your-beer-brewing-hops/.

*Primary Examiner* — Vera Stulii
(74) *Attorney, Agent, or Firm* — Sunit Talapatra; Foley & Lardner LLP

(57)        ABSTRACT

A process of preparing a liquid hop extract suspension or a liquid hop extract is disclosed, comprising:
  (a) providing a hop material selected from hops, dried hops, hop pellets and combinations thereof;
  (b) combining 100 parts by weight of aqueous liquid with 1-20 parts by weight of the hop material to produce a hop suspension containing at least 95 wt. % water;
  (c) maintaining the hop suspension at a temperature of 8-40° C. for at least 1 hour to produce a liquid hop extract suspension; and
  (d) subjecting the liquid hop extract suspension to solid-liquid separation to produce a liquid hop extract and hop residue.
A method of producing a packaged carbonated low alcohol beer having an alcohol content of 0-1.5% ABV with the liquid hop extract suspension or the liquid hop extract is also disclosed.

6 Claims, No Drawings

HOP EXTRACT

CROSS-REFERENCE TO RELATED APPLICATIONS

This application is a continuation of International Patent Application No. PCT/EP2021/085741 filed Dec. 14, 2021, which application claims priority to European Patent Application No. 20215228.6 filed Dec. 17, 2020, the contents of which are all incorporated herein by reference in their entireties.

TECHNICAL FIELD OF THE INVENTION

The present invention relates to a liquid hop extract that is prepared by a process that comprises an aqueous extraction at mild temperatures.

The invention further provides a method of producing a packaged carbonated low alcohol beer, said method comprising addition of the aforementioned liquid hop extract to beer having an alcohol content of 0-1.5% ABV, followed by carbonation and packaging.

BACKGROUND OF THE INVENTION

Beer is a universally popular beverage, consumed worldwide. Beer is commonly produced by a process that comprises the following basic steps:

mashing a mixture of grain and water to produce a mash;

separating the mash in wort and spent grain;

boiling the wort in the presence of hops, to produce a boiled wort;

fermenting the boiled wort with live yeast to produce a fermented wort;

subjecting the fermented wort to one or more further process steps (e.g. maturation and filtration) to produce beer; and packaging the beer in a sealed container, e.g. a bottle, can or keg.

Hops are the flowers of the hop plant *Humulus lupulus*. They are used primarily as a bittering, flavouring, and stability agent. In addition to bitterness, hops impart floral, fruity, or citrus flavours and aromas.

Dry hopping is a technique that refers to any hop addition after the wort has been cooled. Due to the fact that no volatile oils are boiled off, dry hopping provides a floral hop essence and an intense flavour that is desirable in hoppy beer styles like pale ales and IPAs. What dry hopping does not add to the beer is substantial bitterness. Boiling is necessary to convert the alpha acids in the hops to iso-alpha acids to create bitterness.

In recent years, the beer market has witnessed a significant increase in the consumption of non-alcoholic beer. This increase is triggered by concerns about health, and is expedited by innovations that have substantially improved the quality of non-alcoholic beers.

Low alcohol beers, including non-alcoholic beers, can be produced by a classical brewing process followed by alcohol removal ("de-alcoholisation") by techniques such as vacuum distillation, reverse osmosis, dialysis or evaporation.

De-alcoholisation of beer is performed on regularly brewed beer, and is designed to remove ethanol, but as little as possible other flavour components. De-alcoholisation may be achieved by, for instance, rectification, reverse osmosis or dialysis of regular beer. However, it is challenging to prevent flavour deprivation upon de-alcoholisation of beer. Consequently, a drawback of de-alcoholised beer is a flat flavour, which may be corrected by addition of flavour (taste and odor) compounds. However, adding flavour is costly and requires at least one additional unit operation. Moreover, it is far from easy to obtain an agreeable taste by the addition of flavour after de-alcoholisation due to the flavour of a beverage being the result of a complex and delicate balance between the constituents of the beverage, amongst others the quantity and type of various sugars, esters, aldehydes, as well as the quantity of alcohols, particularly ethanol. The presence of alcohol, particularly ethanol, suppresses some taste attributes, and enhances others.

Low alcohol beer may also be produced using a yeast fermentation with restricted formation of ethanol. Cold-contact fermentation is an example of such a method. Production of ethanol during yeast fermentation may also be minimised by using yeast strains which produce relatively low quantities of ethanol under the applied fermentation conditions (e.g. Crabtree negative strains) or by including yeast strains that consume ethanol (e.g. *Saccharomyces rouxii*).

U.S. Pat. No. 5,384,135 describes a process for the manufacture of an alcohol-free pale beer, comprising the manufacture of a lager type alcoholic pale beer, the dealcoholisation of the said alcoholic pale beer by evaporation, under high vacuum, at least one dilution with water, wherein the said water is deoxygenated and demineralised water having a total hardness of less than 1.8° dH.

Example 1 of the US patent describes a process in which dealcoholised beer concentrate (14-18% dry matter) is treated with charcoal, followed by:

dilution and addition of sugar solution, addition of flavours, addition of pre-isomerised and flavoured hop extract, carbonation, filtration, and bottling.

Liguori et al. (*Impact of Osmotic Distillation on the Sensory Properties and Quality of Low Alcohol Beer*, Journal of Food Quality, vol. 2018, 2018, pages 1-11) describes a study in which the impact of osmotic distillation on the sensory properties of low alcohol beer was investigated. The article reports that hop (*Humulus lupulus*, cascade variety; 6.8% α-acids) extract and pectins solutions at a concentration of 2 mL each in 100 mL were added to 5 L of dealcoholised beer, followed by carbonation. The dealcoholised beer was produced by fermenting a hopped and clarified wort, followed by osmotic distillation. No information is provided about the hop extract.

Kowalczyk et al. (*The phenolic content and antioxidant activity of the aqueous and hydroalcoholic extracts of hops and their pellets*, J Inst. Brew. (2013), 119: 103-110) describe a study in which it was investigated how three different extraction liquids {water, 50% methanol and 50% ethanol) affected the yields of phenolic substances and the antioxidant capacity of extracts prepared from hops and their pellets. The total phenolic and total flavonoid contents, as well as antioxidant activity of the hydroalcoholic extracts were found to be significantly higher than those of aqueous extracts. Aqueous hop extract was prepared by extracting crushed hop products (1 g in triplicate) three times with 30 mL of water on a shaking water-bath at 40° C. for 1 h.

US 2007/254063 describes a method for the production of a polyphenol-rich brewing additive comprising extraction of hop material with an aqueous ethanol solvent having an ethanol to water ratio lower than 20:1 and higher than 1:10 (v/v).

WO 2020/016412 describes a method of producing an aroma extract comprising:

a) providing a container containing a mixture of plants or parts thereof and a liquid, and a positive gas flow pressure, b) shearing the plant in said liquid, thereby forming a plant slurry, c) passing the plant slurry through a hydrodynamic cavitation unit, whereby plant aromas are extracted, d) optionally repeating steps (b) and/or (c) a plurality of times, whereby a plant aroma extract is produced.

SUMMARY OF THE INVENTION

The present invention provides a process of preparing a liquid hop extract suspension or a liquid hop extract, said process comprising:

(a) providing a hop material selected from hops, dried hops, hop pellets and combinations thereof;

(b) combining 100 parts by weight of aqueous liquid with 1-20 parts by weight of the hop material to produce a hop suspension, said aqueous liquid containing at least 95 wt. % water;

(c) maintaining the hop suspension at a temperature of 15-35° C. for at least 3 hours to produce a liquid hop extract suspension;

(d) subjecting the liquid hop extract suspension to solid-liquid separation to produce a liquid hop extract and hop residue.

The invention also provides a liquid hop extract suspension or a liquid hop extract that is obtained by the aforementioned process, said suspension or extract having an ethanol content of not more than 1 vol. % and containing:

a. 3-300 mg/L of alpha-acids selected from humulone, cohumulone, adhumulone, prehumulone, posthumulone and combinations thereof;

b. 0.5-20 mg/L of iso-alpha acids selected from isohumulone, isocohumulone, isoadhumulone and combinations thereof c. 500-20,000 µg/L of myrcene;

d. 100-4,000 µg/L of beta-linalool;

e. 50-2,000 µg/L of geraniol;

f. 10-400 µg/L of humulene;

g. 12-500 µg/L of limonene.

Further provided is a method of producing a packaged carbonated beer having an alcohol content of 0-1.0% alcohol by volume (ABV), said method comprising the steps of:

providing a beer having an alcohol content of 0-1.5% ABV;

combining the beer having an alcohol content of 0-1.5% ABV with the liquid hop extract suspension or the liquid hop extract of the present invention to produce a zesty beer;

carbonating the zesty beer to produce a carbonated beer having a dissolved carbon dioxide content of at least 2 g/L; and packaging the carbonated beer in a sealed container.

Finally, the invention provides a low alcohol beer that is obtained by the latter method.

The inventors have found that addition to low alcohol beer of the hop extract of the present invention significantly improves the taste of the beer by rendering it more complex and by introducing pleasant flavour notes, e.g. aromatic hoppy, tropical flavour notes.

In comparison to dry hopping, the addition of a hop extract of the invention offers the advantage that flavour is extracted more efficiently from the hop material as the extraction can be carried out at near ambient temperatures, under continuous stirring and at neutral pH.

DETAILED DESCRIPTION OF THE INVENTION

A first aspect of the invention relates to a process of preparing a liquid hop extract suspension or a liquid hop extract, said process comprising:

(a) providing a hop material selected from hops, dried hops, hop pellets and combinations thereof;

(b) combining 100 parts by weight of aqueous liquid with 1-20 parts by weight of the hop material to produce a hop suspension, said aqueous liquid containing at least 95 wt. % water;

(c) maintaining the hop suspension at a temperature of 15-25° C. for at least 3 hours to produce a liquid hop extract suspension;

(d) subjecting the liquid hop extract suspension to solid-liquid separation to produce a liquid hop extract and hop residue.

The term "a" or "an" as used herein is defined as "at least one" unless specified otherwise. When referring to a noun (e.g. a compound, an additive, etc.) in the singular, the plural is meant to be included. Thus, when referring to a specific moiety, e.g. "terpene", this means "at least one" of a terpene, e.g. "at least one terpene, unless specified otherwise. The term "or" as used herein is to be understood as "and/or".

When referring to a compound of which several isomers exist (e.g. a D and an L enantiomer), unless indicated otherwise, the compound includes all enantiomers, diastereomers and cis/trans isomers of that compound.

The term "alcohol" as used herein, unless indicated otherwise, is synonymous with "ethanol".

The term "low alcohol" as used herein, unless indicated otherwise, means an alcohol content of between 0 and 1.0% alcohol by volume (ABV).

The hop material that is employed in the present extraction process is preferably selected from dried hops, hop pellets and combinations thereof.

The aqueous liquid that is employed preferably contains at least at least 98 wt. % water.

The present process of preparing a liquid hop extract suspension or a liquid hop extract preferably comprises combining 100 parts by weight of aqueous liquid with 1-10 parts by weight of the hop material to produce a hop suspension. More preferably, the process comprises combining 100 parts by weight of aqueous liquid with 2-6 parts by weight of the hop material to produce a hop suspension.

According to a particularly preferred embodiment of the extraction process, in step (b) the aqueous liquid is further combined with yeast to produce the hop suspension. The yeast employed can be dry yeast or wet yeast. Preferably, the yeast is live yeast. It was surprisingly found that the presence of yeast in the hop suspension yields an extract with a more intense and more desirable flavour. Although the inventors do not wish to be bound by theory it is believed that the yeast may contain surface-active substances that aid the extraction of lipophilic component from the hop material. Furthermore, yeast metabolism may produce flavour substances that complement the flavour substances that originate from the hop material.

In a preferred embodiment of the present process, in step (b) 100 parts by weight of aqueous liquid are combined with 0.005-1.0 parts by weight of yeast dry matter. More preferably, 100 parts by weight of aqueous liquid are combined with 0.01-0.2 parts by weight of yeast dry matter. Here the term "yeast dry matter" refers to the dry matter that is contained in the yeast.

In step (c) of the present process, the hop suspension is preferably maintained at a temperature of 15-35° C. for 4-200 hours.

The hop suspension is preferably continuously stirred during step (c).

According to a preferred embodiment, the extraction in step (c) is carried out under an atmosphere having a reduced oxygen content (e.g. under an atmosphere of nitrogen and/or carbon dioxide). Most preferably, the extraction step is carried out under an atmosphere of carbon dioxide.

Oxygen present in the aqueous liquid or in the hop suspension may be removed at the beginning of step (c) by flushing with nitrogen and/or carbon dioxide or by applying vacuum.

The hop suspension preferably has a pH in the range of 6.0 to 8.5, more preferably in the range of 6.2 to 8.0 at the beginning of the extraction step (c).

According to an embodiment of the present process, the liquid hop extract suspension is subjected to a solid-liquid separation step (d). This separation step can be carried out using solid-liquid separation techniques well-known in the art, such as filtration, centrifugation, decanting and hydro-cyclones. Most preferably, the liquid hop extract suspension is subjected to filtration to produce a liquid hop extract.

Another aspect of the invention relates to a liquid hop extract suspension or a liquid hop extract that is obtained by the aforementioned extraction process, said suspension or extract having an ethanol content of not more than 1 vol. % and containing:

a. 3-300 mg/L of alpha-acids selected from humulone, cohumulone, adhumulone, prehumulone, posthumulone and combinations thereof;

b. 0.5-20 mg/L of iso-alpha acids selected from isohumulone, isocohumulone, isoadhumulone and combinations thereof c. 500-20,000 μg/L of myrcene;

d. 100-4,000 μg/L of beta-linalool;

e. 50-2,000 μg/L of geraniol;

f. 10-400 μg/L of humulene;

g. 12-500 μg/L of limonene.

Due to the special extraction conditions employed in the present process a liquid hop extract suspension or a liquid hop extract having a unique composition is obtained.

In a preferred embodiment, the liquid hop extract suspension has a water content of at least 90 wt. %, more preferably of at least 95 wt. %.

The liquid hop extract suspension preferably contains not more than 0.5 vol. % ethanol and most preferably 0.05-0.3 vol. % ethanol.

In another preferred embodiment, the liquid hop extract has a water content of at least 93 wt. %, more preferably of at least 97 wt. %. The liquid hop extract preferably contains not more than 1 vol. % ethanol, more preferably not more than 0.5 vol. % ethanol and most preferably 0.05-0.3 vol. % ethanol.

Both the liquid hop extract suspension and the liquid hop extract of the present invention can be provided in concentrated form by selectively removing water. This may be achieved, for instance, by means of reverse osmosis.

The liquid hop extract suspension or liquid hop extract preferably contains 5-200 mg/L, more preferably 10-100 mg/L of alpha-acids selected from humulone, cohumulone, adhumulone, prehumulone, posthumulone and combinations thereof.

The iso-alpha acids are preferably present in the liquid hop extract suspension or liquid hop extract in a concentration of 1.0-15 μg/L, more preferably in the range of 1.2-12 μg/L.

The myrcene content of the liquid hop extract suspension or liquid hop extract is preferably in the range of 1,000-15,000 μg/L, more preferably in the range of 1,200-12,000 μg/L.

The beta-linalool content of the liquid hop extract suspension or liquid hop extract is preferably in the range of 150-3,000 μg/L, more preferably in the range of 220-2,200 μg/L.

The geraniol content of the liquid hop extract suspension or liquid hop extract is preferably in the range of 80-1,500 μg/L, more preferably in the range of 120-1,200 μg/L.

The humulene content of the liquid hop extract suspension or liquid hop extract is preferably in the range of 20-300 μg/L, more preferably in the range of 25-250 μg/L.

The limonene content of the liquid hop extract suspension or liquid hop extract is preferably of 30-450 μg/L, more preferably in the range of 40-400 μg/L.

According to another preferred embodiment, the liquid hop extract suspension or liquid hop extract contains 0.5-30 μg/L, more preferably 1-20 μg/L, most preferably 1.5-15 μg/L of methyl mercaptan.

Myrcene and beta-linalool are preferably contained in the liquid hop extract suspension or liquid hop extract in a weight ratio in the range of 1:1 to 12:1, more preferably in the range of 2:1 to 8:1.

Geraniol and limonene are preferably contained in the liquid hop extract suspension or liquid hop extract in a weight ratio in the range of 1:1 to 12:1, more preferably in the range of 2:1 to 8:1.

The total polyphenol content of the liquid hop extract suspension or liquid hop extract is preferably in the range of 100-4,000 mg/L, more preferably 150-3,000 mg/L, most preferably 200-2.00 mg/L. The total polyphenol content can suitably be determined in accordance with MEBAK WBBM 2.16.1.

A further aspect of the invention relates to a method of producing a packaged carbonated beer having an alcohol content of 0-1.0% alcohol by volume (ABV), said method comprising the steps of:

providing a beer having an alcohol content of 0-1.5% ABV;

combining the beer having an alcohol content of 0-1.5% ABV with the liquid hop extract suspension or liquid hop extract of the present invention to produce a zesty beer;

carbonating the zesty beer to produce a carbonated beer having a dissolved carbon dioxide content of at least 2 g/L; and packaging the carbonated beer in a sealed container.

In a preferred embodiment the beer is filtered after addition of the liquid hop extract suspension and before the packaging.

The present method is preferably used in factory scale production of low alcohol beer. Accordingly, in a preferred embodiment, the beer is combined with the beer is filtered after addition of the liquid hop extract suspension and before the packaging hop extract to produce at least 10 hl of zesty beer, more preferably to produce at least 50 hl of zesty beer and most preferably to produce 300-10,000 hl of zesty beer.

The low alcohol beer that is combined with the liquid hop extract suspension or liquid hop extract in the present method preferably has an alcohol content of 0-1.0% ABV, more preferably of 0-0.5% ABV.

The packaged carbonated beer preferably has an alcohol content of 0-0.8% ABV, more preferably of 0-0.4% ABV.

The beer having an alcohol content of 0-1.5% ABV can suitably be produced by a method comprising the following steps:

mashing a mixture of grain and water to produce a mash;

separating the mash in wort and spent grain;

boiling the wort;

fermenting the boiled wort with live yeast to produce a beer.

The aforementioned method preferably comprises addition of hops and/or hops extract to the wort before or during wort boiling.

The fermentation of the boiled wort may yield an alcoholic beer which is subsequently de-alcoholised to reduce the alcohol content to 0-1.5% ABV. Alternatively, the yeast fermentation is carried out with restricted formation of ethanol, e.g. by employing cold-contact fermentation.

According to a preferred embodiment of the present method, the beer having an alcohol content of 0-1.5% ABV is produced by de-alcoholising an alcoholic beer having an alcohol content of 1.8-12% ABV. The alcoholic beer which is subjected to the de-alcoholisation step preferably has an alcohol content of between 2 and 8% ABV, more preferably of between 2.5 and 8% ABV, even more preferably between 3 and 7.5% ABV, yet more preferably between 4 and 7% ABV, and most preferably between 4.5 and 6% ABV.

According to a particularly preferred embodiment, the boiled wort is fermented with live yeast to produce an alcoholic beer having an alcohol content of 1.8-12% ABV and the alcoholic beer is de-alcoholised to produce the low alcohol beer having an alcohol content of 0-1.5% ABV.

In the present method preferably at least 50%, more preferably at least 70% and most preferably at least 80% of the alcohol present in the alcoholic beer is removed in the de-alcoholisation step.

In one embodiment the alcoholic beer which is subjected to the de-alcoholisation step is a lager. Alternatively, the alcoholic beer which is subjected to the de-alcoholisation step is an ale, more preferably an IPA (India Pale Ale).

Lager beer is typically produced using a bottom fermenting yeast such as *S. eubayanus*, *C. carlsbergensis*, or *C. pasteurianum*, whilst ale is typically produced using a top fermenting yeast such as *S. cerevisiae*.

De-alcoholisation can be done using techniques known in the art, such as reverse osmosis, dialysis or evaporation (see for general methodology Mangindaan et al., Trends in Food Science and Technology 71 (2018), 36-45; and Brányik et al, J. Food Eng. 108 (2012), 493-506).

In a preferred embodiment de-alcoholisation is done using distillation, more preferably vacuum distillation. Vacuum distillation is a technique which is well known in the art.

The skilled person is capable of determining suitable conditions for distillation based on common general knowledge and the information disclosed herein.

In an embodiment, distillation is performed at a temperature of between 10-100° C., more preferably 20-65° C., most preferably 30-50° C.

Distillation may be performed at reduced pressure, such as at a pressure of 0.01-500 mbar, preferably 1-200 mbar, most preferably 10-150 mbar.

Vacuum distillation may comprise one or more of the steps of:

pre-heating of the alcoholic malt beverage, for example in a heat exchanger degassing of the alcoholic malt beverage, for example in a vacuum degasser separation of ethanol from the alcoholic malt beverage, in one or more vacuum columns, for example a packed-bed column cooling and optional carbonation.

In a preferred embodiment of the present invention 100 parts of the beer having an alcohol content of 0-1.5% ABV are combined with 10 to 60 parts by weight of the liquid hop extract suspension or liquid hop extract. More preferably, 100 parts of the beer are combined with 15 to 45 parts by weight of the liquid hop extract suspension or liquid hop extract.

The amount of liquid hop extract suspension or liquid hop extract that is combined with the beer in the present method preferably is equivalent to 200 to 2,000 grams of dry hop per hL, more preferably to 300 to 1,500 grams of dry hop per hL.

The carbonated beer that is obtained in the present method preferably has a turbidity (EBC, 90°, 0° C., 650 nm) of less than 10, more preferably of less than 8 and most preferably of less than 7.

At the end of the present method the carbonated beer is packaged in a sealed container. Examples of suitable containers include bottles, cans, kegs and tanks.

Another aspect of the invention relates to a packaged low alcohol beer that is obtained by the method as described herein before.

The invention is illustrated by means of the following non-limiting examples.

EXAMPLES

Example 1

A lager beer, containing 7.2% alcohol ABV (15.8° P), was produced by mashing a mixture of barley malt and water to produce a mash; separating the mash in wort and spent grain; boiling the wort in the presence of hops to produce a boiled wort; fermenting the boiled wort with live yeast to produce a fermented wort; and subjecting the fermented wort to maturation and filtration to produce said lager. Subsequently, the beer was de-alcoholised by vacuum distillation (Schmidt-Bretten, Bretten, Germany). The de-alcoholised beer so obtained had an extract of 6.3° P and an alcohol content of 0.03% ABV.

An aqueous hop extract was prepared by introducing 10 hL of deaerated water into a stirred vessel. Next, a hop pellets blend (1/5 citra cryo, 2/5 mosaic and 2/5 simcoe-2.5 kg/hL) and dried yeast (30 g/hL) were introduced into the vessel. The suspension of hop and yeast was flushed with carbon dioxide to remove oxygen, following which the vessel was closed and kept under carbon dioxide atmosphere. The suspension of hop and yeast was kept at 20° C. for 72 hours and was continuously stirred during that period.

Next, the suspension was filtered to produce a clear hop extract. The composition of the hop extract was analysed. The results are shown in Table 1.

TABLE 1

|  | Concentration | Unit |
| --- | --- | --- |
| Polyphenols | 422 | mg/L |
| Iso-alpha acids | 4.6 | mg/L |
| Alpha acids | 50 | mg/L |

TABLE 1-continued

| | Concentration | Unit |
|---|---|---|
| Myrcene | 3,530 | µg/L |
| Limonene | 125 | µg/L |
| Linalool | 997 | µg/L |
| Terpineol | 51 | µg/L |
| Citronellol | 78 | µg/L |
| Nerol | 104 | µg/L |
| Geraniol | 482 | µg/L |
| Humulene | 92 | µg/L |
| Methyl mercaptan | 5,000 | ng/L |

The dealcoholised lager beer (30.8 hL) was mixed with the aqueous hop extract (9.2 hl), filtered, carbonised to approximately 5.5 g/L $CO_2$, pasteurised and bottled.

The final beer had a pH of 4.6 and a turbidity of 4.5 EBC (90°, 0° C., 650 nm).

Example 2

Example 1 was repeated, except that this time instead of aqueous hop extract an equivalent amount of the non-filtered liquid hop extract suspension was added to the dealcoholised lager beer. Also in this case a beer with a low turbidity was obtained.

Example 3

Two weeks after production, the beers of Examples 1 and 2 were compared with a beer that was also produced two weeks earlier by dry hopping the de-alcoholised beer of Example 1 with 584 g/hL of the same hop blend as in Example 1 for 72 hours at 2° C.

The three low alcohol beers so obtained are subjected to a blind evaluation by a taste panel.

The panel has a clear preference for the low alcohol beers of Examples 1 and 2.

The invention claimed is:

1. A method of producing a packaged carbonated beer having an alcohol content of 0-1.0% alcohol by volume (ABV), the method comprising:
    (a) providing a beer having an alcohol content of 0-1.5% ABV;
    (b) combining the beer with a liquid hop extract suspension or a liquid hop extract to produce a zesty beer;
    (c) carbonating the zesty beer to produce a carbonated beer having a dissolved carbon dioxide content of at least 2 g/L; and
    (d) packaging the carbonated beer in a sealed container; wherein the liquid hop extract suspension or a liquid hop extract has an ethanol content of not more than 1 vol. % and comprises:
        (i) 3-300 mg/L of alpha-acids selected from humulone, cohumulone, adhumulone, prehumulone, posthumulone and combinations thereof;
        (ii) 0.5-20 mg/L of iso-alpha acids selected from isohumulone, isocohumulone, isoadhumulone and combinations thereof;
        (iii) 500-20,000 ug/L of myrcene;
        (iv) 100-4,000 ug/L of beta-linalool;
        (v) 50-2,000 ug/L of geraniol;
        (vi) 10-400 ug/L of humulene; and
        (vii) 12-500 ug/L of limonene.

2. The method according to claim 1, further comprising filtering the beer after addition of the liquid hop extract suspension and before the packaging.

3. The method according to claim 1, wherein 100 parts of the beer having an alcohol content of 0-1.5% ABV are combined with 10 to 60 parts by weight of the liquid hop extract.

4. The method according to claim 1, wherein the beer having an alcohol content of 0-1.5% ABV is produced by de-alcoholising an alcoholic beer having an alcohol content of 1.8-12% ABV.

5. The method according to claim 1, wherein the beer having an alcohol content of 0-1.5% ABV is produced by a method comprising:
    (i) mashing a mixture of grain and water to produce a mash;
    (ii) separating the mash in wort and spent grain;
    (iii) boiling the wort; and
    (iv) fermenting the boiled wort with live yeast to produce a beer.

6. The method according to claim 5, wherein the boiled wort is fermented with live yeast to produce an alcoholic beer having an alcohol content of 1.8-12% ABV and wherein the alcoholic beer is de-alcoholised to produce the low alcohol beer having an alcohol content of 0-1.5% ABV.

* * * * *